United States Patent
Le Corre et al.

(10) Patent No.: US 12,123,472 B2
(45) Date of Patent: Oct. 22, 2024

(54) SWITCHABLE ANTI-VIBRATION HYDRAULIC MOUNT AND SEPARATION ELEMENT

(71) Applicant: Vibracoustic Nantes SAS, Carquefou (FR)

(72) Inventors: Vincent Le Corre, Vertou (FR); Frédéric Gentet, Le Loroux-Bottereau (FR); Ludovic Chauvet, Mauves-sur-Loire (FR)

(73) Assignee: Vibracoustic Nantes SAS, Carquefou (FR)

(*) Notice: Subject to any disclaimer, the term of this patent is extended or adjusted under 35 U.S.C. 154(b) by 716 days.

(21) Appl. No.: 17/281,790

(22) PCT Filed: Nov. 19, 2019

(86) PCT No.: PCT/EP2019/081781
§ 371 (c)(1),
(2) Date: Mar. 31, 2021

(87) PCT Pub. No.: WO2020/109077
PCT Pub. Date: Jun. 4, 2020

(65) Prior Publication Data
US 2021/0381576 A1 Dec. 9, 2021

(30) Foreign Application Priority Data
Nov. 27, 2018 (FR) .................................. 1871935

(51) Int. Cl.
*F16F 13/00* (2006.01)
*F16F 13/10* (2006.01)
*B60K 5/12* (2006.01)

(52) U.S. Cl.
CPC .......... *F16F 13/107* (2013.01); *F16F 13/102* (2013.01); *F16F 13/106* (2013.01); *B60K 5/1283* (2013.01); *F16F 2230/0005* (2013.01)

(58) Field of Classification Search
CPC ........ F16F 13/10; F16F 13/101; F16F 13/105; F16F 13/106; F16F 13/107; F16F 13/108
(Continued)

(56) References Cited

U.S. PATENT DOCUMENTS

| 4,852,864 A | 8/1989 | Bitschkus et al. |
| 5,499,799 A | 3/1996 | Kojima |

(Continued)

FOREIGN PATENT DOCUMENTS

| CN | 1667292 A | 9/2005 |
| CN | 106062411 A | 10/2016 |

(Continued)

OTHER PUBLICATIONS

International Search Report PCT/EP2019/081781, dated Jan. 8, 2020.
(Continued)

*Primary Examiner* — Christopher P Schwartz
(74) *Attorney, Agent, or Firm* — Fishman Stewart PLLC

(57) ABSTRACT

A partition member of an anti-vibration hydraulic mount includes a first channel and a second channel between the working chamber and the compensating chamber. The partition member includes a membrane secured in a receiving cavity. The membrane divides the receiving cavity into two sub-spaces separated fluidically from each other. The membrane comprises a closing device configured to have an open configuration, in which the closing device is spaced apart from the central opening, and a closed configuration, in which the closing device abuts against the central opening to close the central passageway.

12 Claims, 7 Drawing Sheets

(58) Field of Classification Search
USPC .................................................. 267/140.13
See application file for complete search history.

(56) References Cited

U.S. PATENT DOCUMENTS

| | | | |
|---|---|---|---|
| 5,833,219 A | | 11/1998 | Mellon |
| 2005/0200060 A1 | | 9/2005 | Hiraoka |
| 2006/0157902 A1 | * | 7/2006 | Sakata ................... F16F 13/108 267/140.13 |
| 2012/0228813 A1 | | 9/2012 | Masuda et al. |
| 2012/0248669 A1 | * | 10/2012 | Masuda ................ F16F 13/106 267/140.13 |
| 2013/0043626 A1 | * | 2/2013 | Satori ................... F16F 13/105 267/140.13 |
| 2014/0097564 A1 | | 4/2014 | Satori |
| 2015/0330476 A1 | * | 11/2015 | Satori ................... B60K 5/1208 267/140.13 |
| 2017/0074346 A1 | | 3/2017 | Kirchhoff et al. |

FOREIGN PATENT DOCUMENTS

| | | | | |
|---|---|---|---|---|
| DE | 19801277 A1 | * | 7/1999 | ............ F16F 13/105 |
| DE | 102014002094 A1 | | 8/2014 | |
| EP | 0307741 A2 | | 3/1989 | |
| EP | 0818639 A1 | | 1/1998 | |
| JP | 2006194336 A | * | 7/2006 | |
| JP | 2010031988 A | * | 2/2010 | |
| JP | 2012251574 A | | 12/2012 | |
| JP | 2013032828 A | | 2/2013 | |
| JP | 2013228004 A | * | 11/2013 | |
| JP | 2015215050 A | * | 12/2015 | |
| KR | 1020130136474 | | 12/2013 | |
| WO | 2012054916 A1 | | 4/2012 | |
| WO | WO-2013005261 A1 | * | 1/2013 | ............ F16F 13/106 |

OTHER PUBLICATIONS

European Examination Report for EP19806200.2-1009 May 25, 2023 (6 pages).
Machine English translation JP2013032828.
Korean Office Action KR10-2021-7011921, dated Jun. 28, 2023 (w_Eng_translation).
Chinese Office Action, 201980059087.0, dated Mar. 2, 2022 with translation.

* cited by examiner

[Fig. 1]
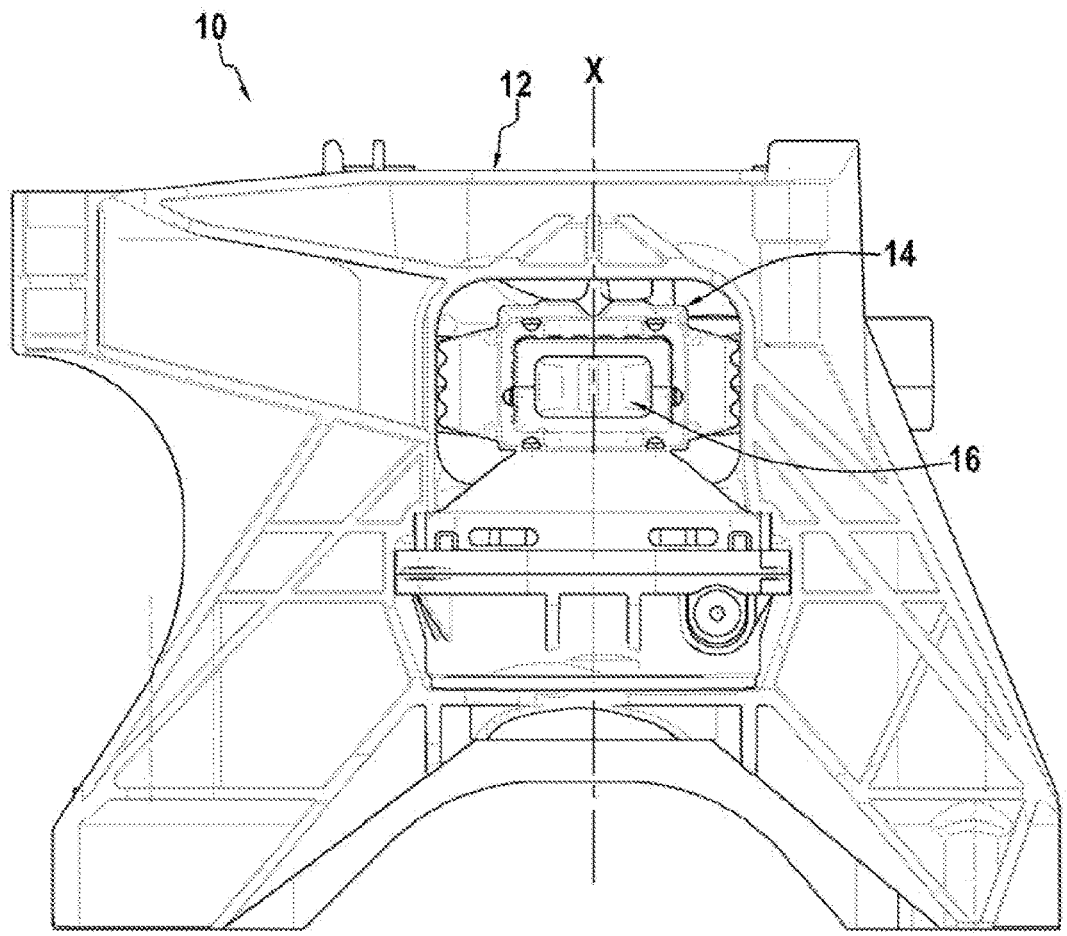
[Fig. 2]
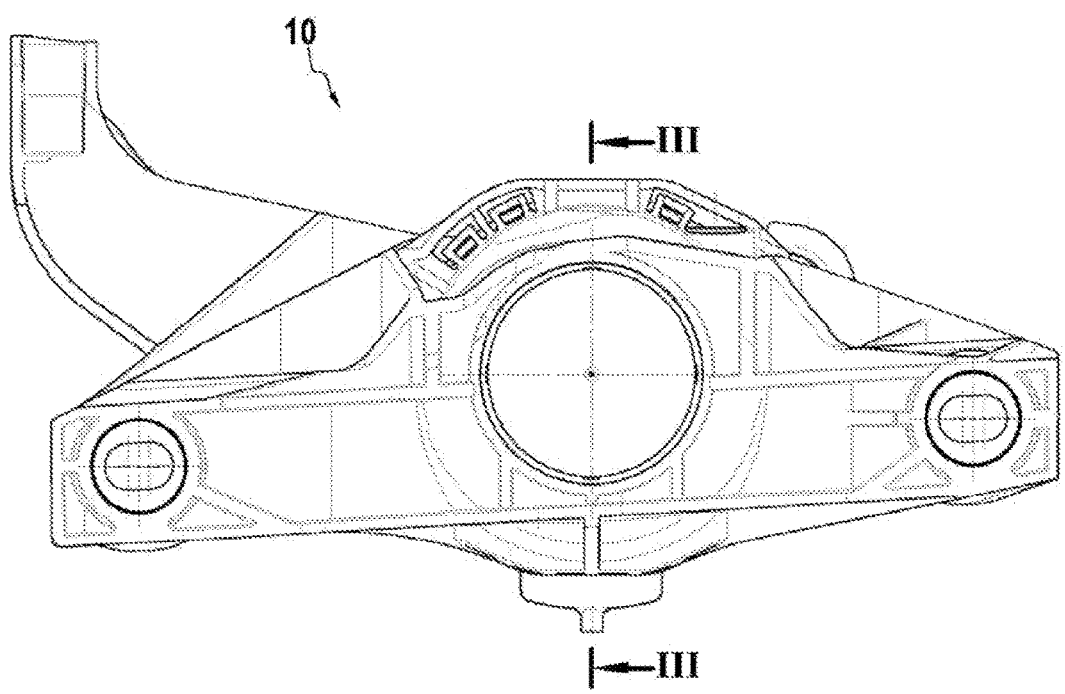

[Fig. 3]
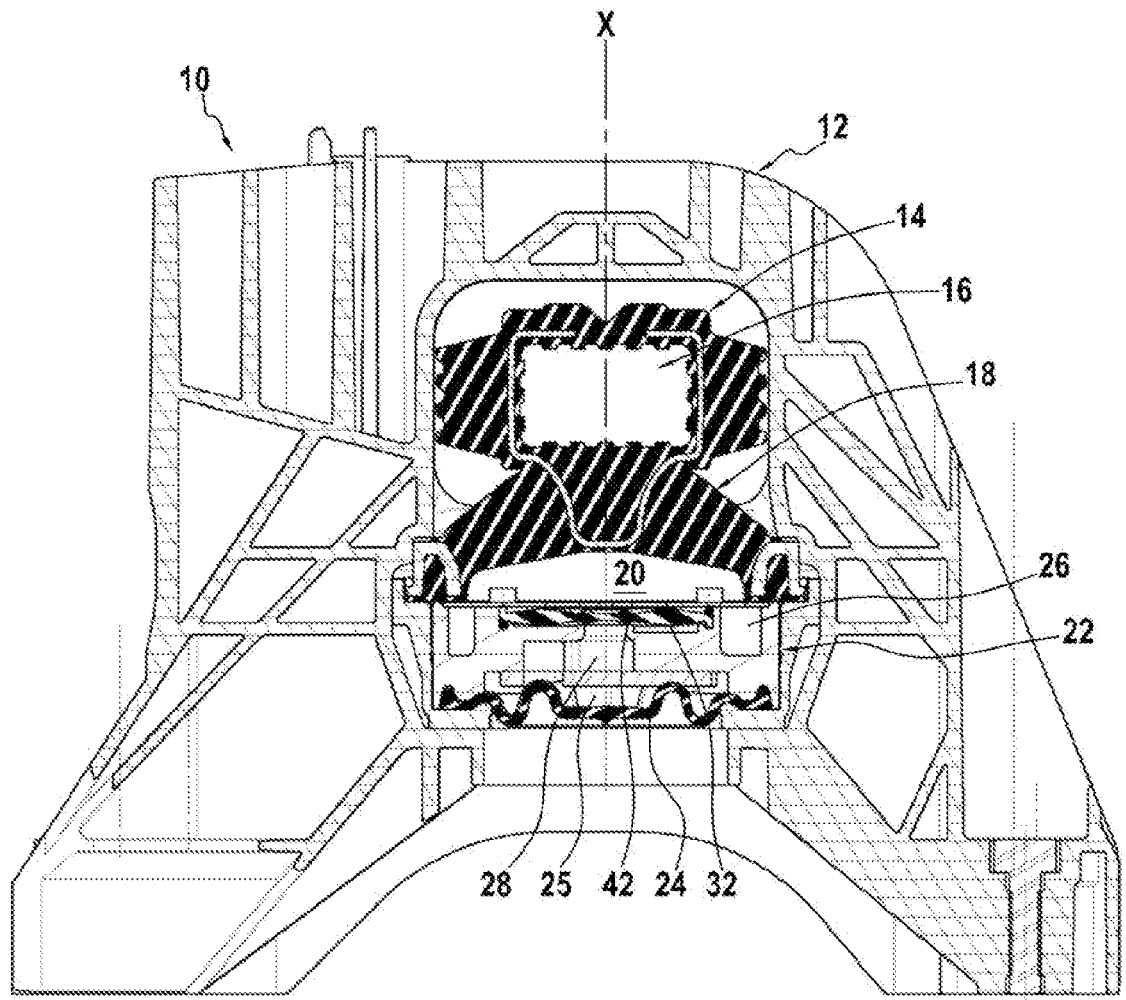

[Fig. 4A]
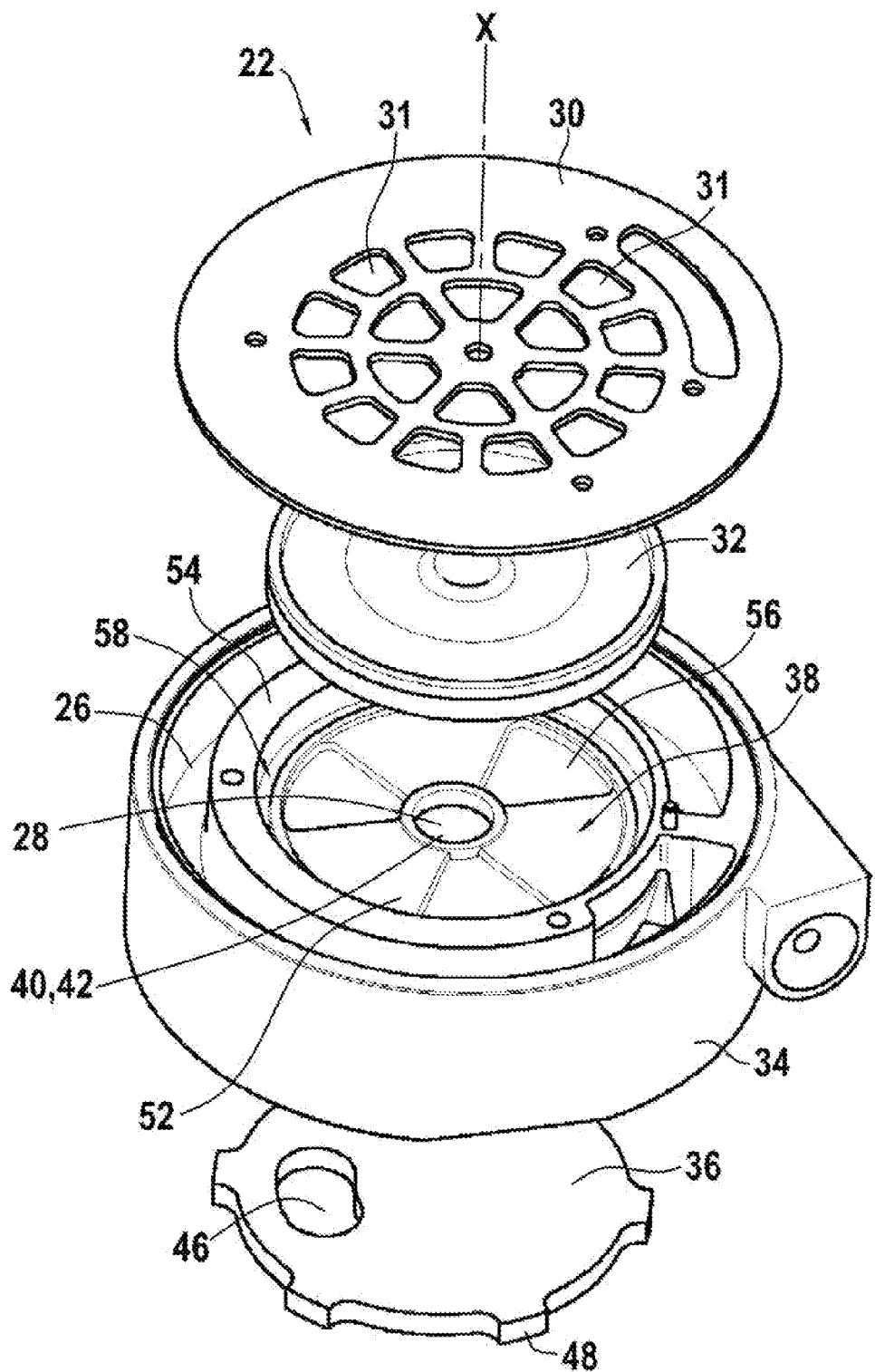

[Fig. 4B]
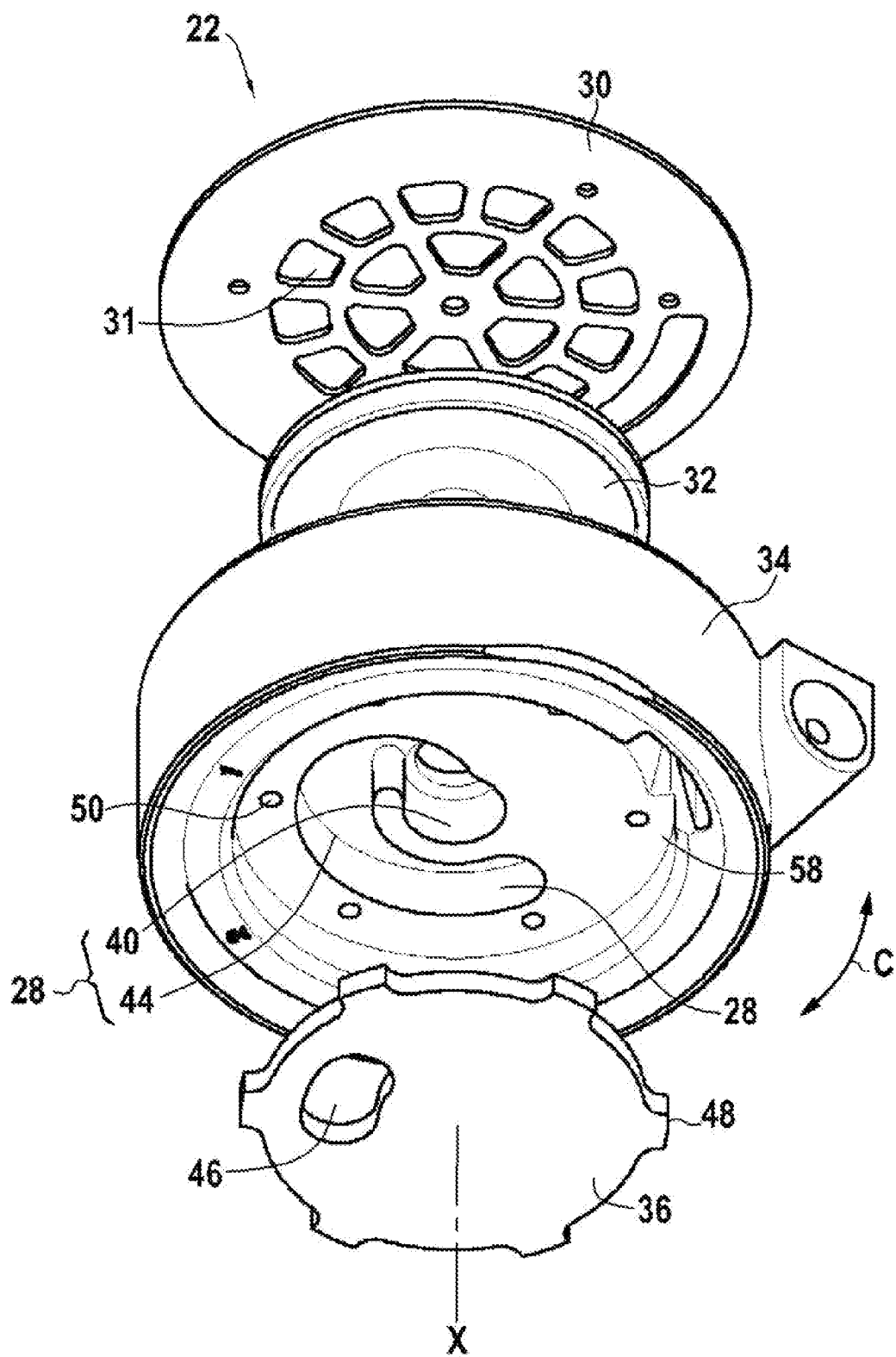

[Fig. 5A]
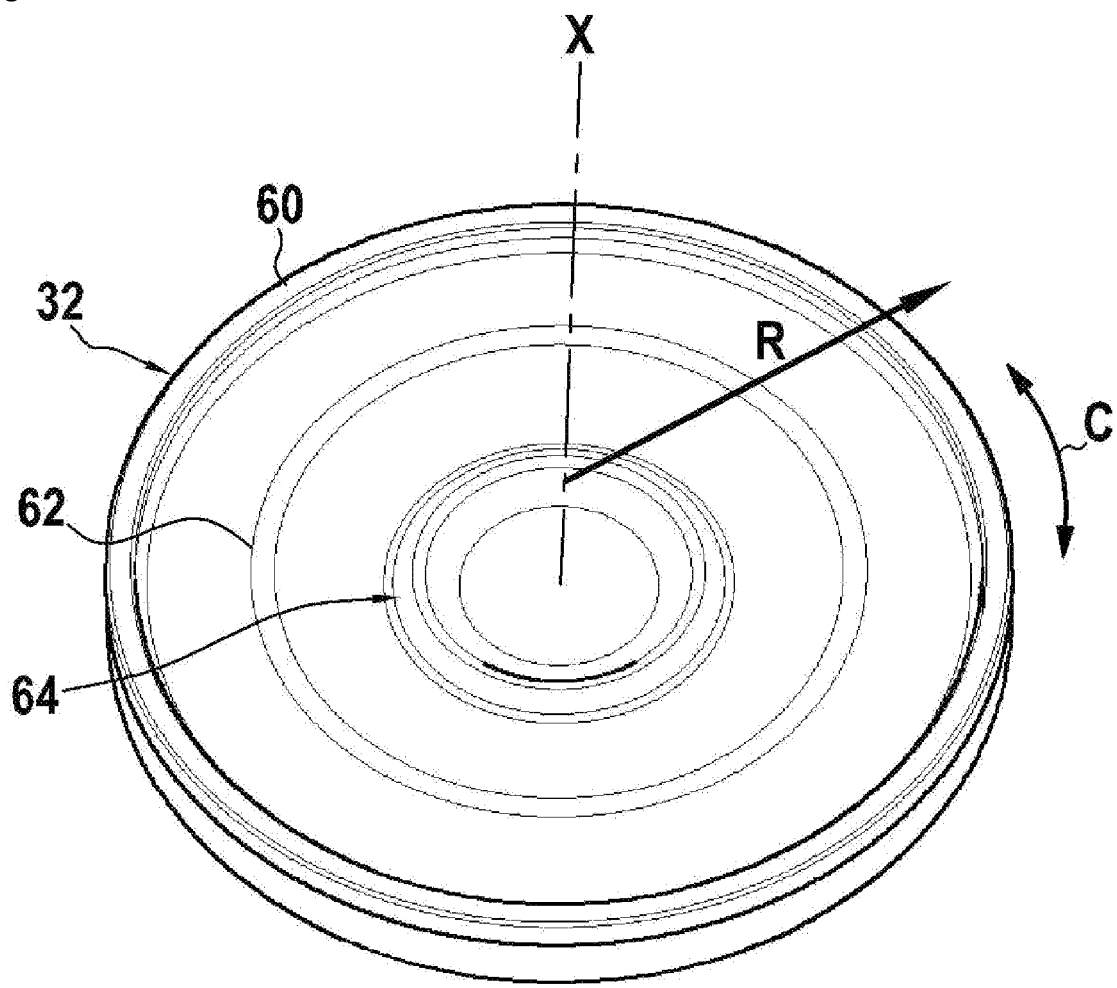
[Fig. 5B]
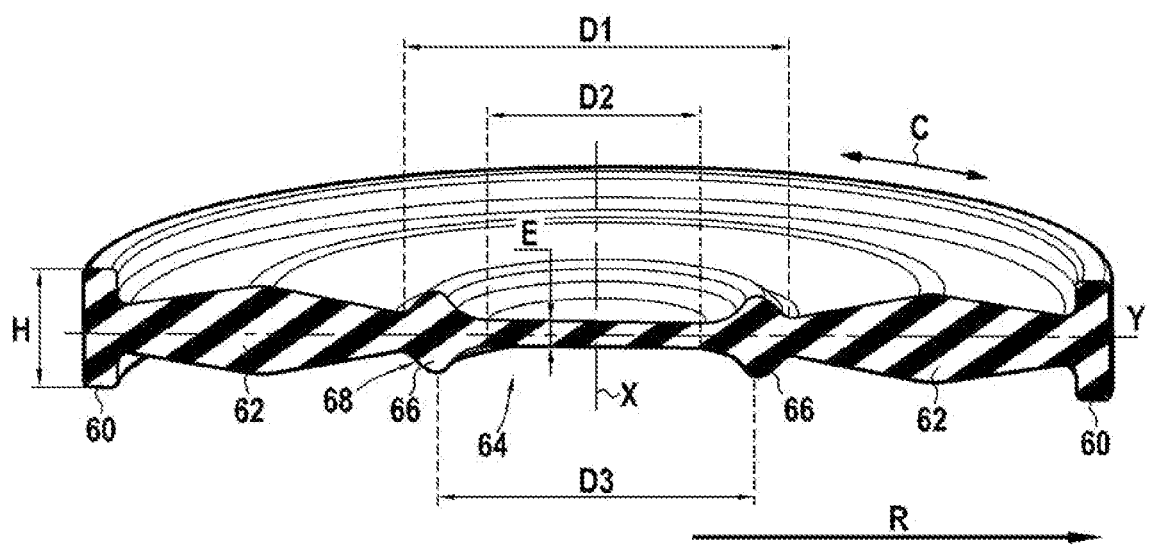

[Fig. 6A]
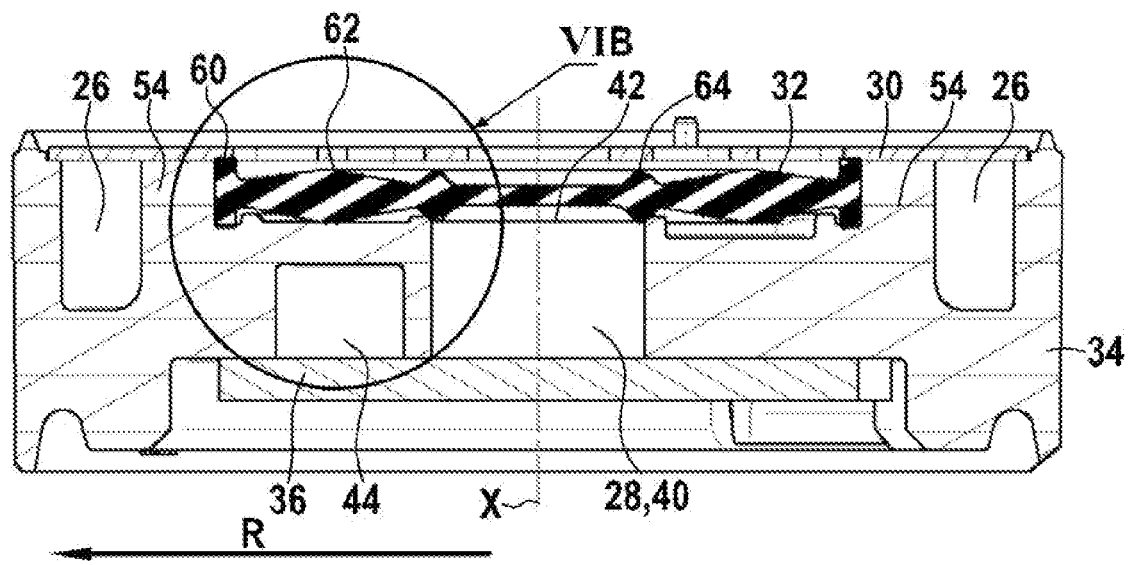
[Fig. 6B]
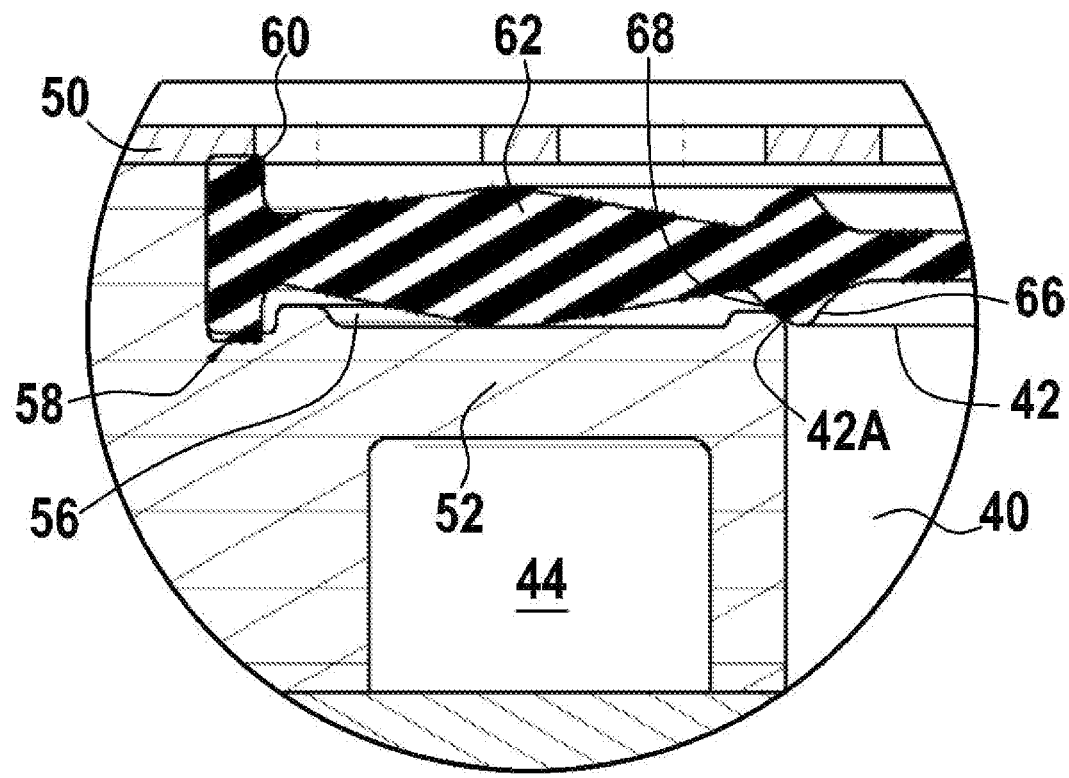

[Fig. 7A]
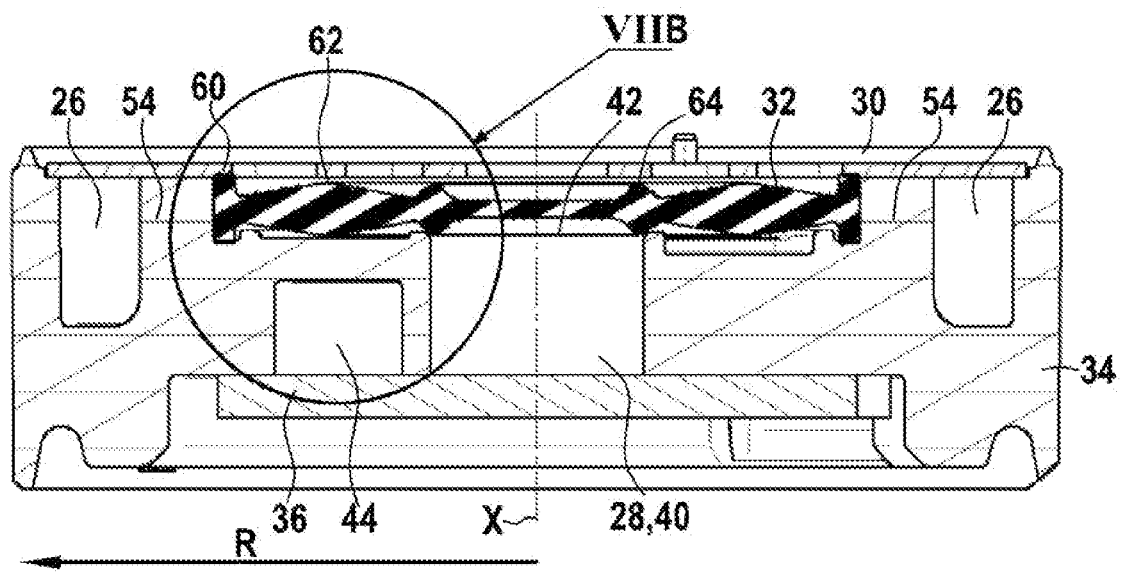
[Fig. 7B]
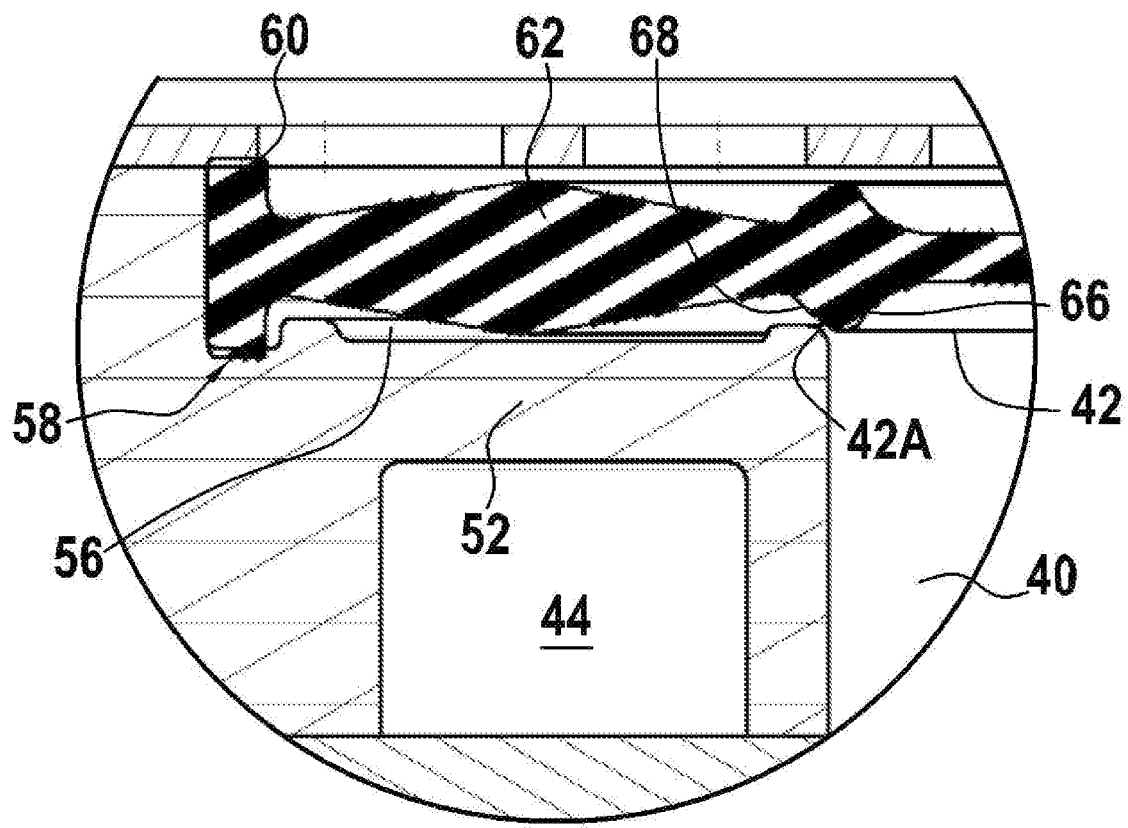

SWITCHABLE ANTI-VIBRATION HYDRAULIC MOUNT AND SEPARATION ELEMENT

CROSS-REFERENCE TO RELATED APPLICATIONS

This application is a national phase application of and claims priority to International Patent Application No. PCT/EP2019/081781, filed Nov. 19, 2019, which claims priority to French Patent Application 1871935, filed Nov. 27, 2018, the contents of which are hereby incorporated by reference in their entireties.

TECHNICAL FIELD

The present disclosure concerns a partition member of an anti-vibration hydraulic mount, and more particularly a partition member of an anti-vibration hydraulic mount configured for mounting an engine on a vehicle body.

BACKGROUND

Anti-vibration devices for mounting an engine on a vehicle body are known, comprising a first frame connected to a second frame by means of an anti-vibration hydraulic mount able to be deformed at least along a main vibration axis.

However, this anti-vibration hydraulic mount is limited to the damping of vibration in a given range of vibration frequencies.

Also, anti-vibration hydraulic mounts are known comprising a switch allowing the dampening of vibration in at least two given ranges of vibration frequencies, for example, in normal operation and in operation with an idling engine.

However, this switch requires the presence and the control of an actuator, which can result in less good reliability of the anti-vibration device.

SUMMARY

The present disclosure aims at remedying at least part of these disadvantages.

To this effect, the present disclosure concerns a partition element or separation element configured to be arranged between a working chamber and a compensating chamber of an anti-vibration hydraulic mount or an anti-vibration hydraulic module, the separation element comprising:
  a first channel configured to form a permanently open passageway between the working chamber and the compensating chamber,
  a second channel configured to form a passageway between the working chamber and the compensating chamber, the second channel comprising a central passageway extending in an axial direction, the central passageway being provided with a central opening, a receiving cavity open towards the working chamber and in fluid communication with the central passageway through the central opening, and
  a membrane fixed in the receiving cavity and dividing the receiving cavity into two sub-spaces separated fluidically from each other, the membrane comprising a closing device protruding from the membrane towards the central opening and being able to adopt two configurations:
  the closing device being spaced apart from the central opening in an open configuration when the membrane is deformed towards the central passageway over a first distance, the closing device being spaced apart from the central opening, and
  the closing device abuts against the central opening to close the central passageway in a closed configuration when the membrane is deformed towards the central passageway beyond the first distance.

Thanks to the membrane that can assume an open configuration and a closed configuration, depending on the vibration frequencies and the membrane's vibration amplitude, it is possible to modify the damping characteristics of the anti-vibration hydraulic mount in two vibration frequency ranges. The membrane thus acts like a passive switch permitting the changing of the main frequency of the damping characteristics. As the membrane does not need to be switched actively, i.e. with an actuator, between a closed position and an open position, the membrane is a passive switch permitting the changing of the damping characteristics of the anti-vibration hydraulic mount. The risk of bad operation of the anti-vibration hydraulic mount linked with the bad operation of an actuator permitting the changing of the main frequency of the damping characteristics is thus eliminated. The anti-vibration hydraulic mount is hence more robust and more reliable.

In fact, in the presence of vibrations having a high frequency, i.e. between 18 Hz and 30 Hz (hertz), but a low amplitude, i.e. in the order of 0.1 mm, the membrane vibrates at an amplitude of 0.1 mm because of the pressure difference between the working chamber and the compensating chamber. As a result of the low amplitude of the vibrations, the closing device does not block the central passageway, i.e. the membrane is in an open configuration, so that the first channel as well as the second channel contribute to the damping characteristics of the anti-vibration hydraulic mount.

When the membrane is subjected to vibrations having a low frequency, i.e. a frequency corresponding to the movement of the solid body of the engine, approximately 10 Hz, and of high amplitudes, i.e. in the order of 1 mm, the membrane is deflected in such a way that the closing device abuts against the central opening, i.e. the membrane is in a closed configuration. Hence, the central passageway is blocked. In this case, only the first channel makes a contribution to the damping characteristics of the anti-vibration hydraulic mount.

In certain embodiments, the closing device comprises an annular protrusion.

In certain embodiments, the annular protrusion shows a lateral wall.

In certain embodiments, the lateral wall is inclined relative to the axial direction of the central passageway, the annular protrusion being configured to abut against an internal circumferential wall of the central opening in a closed configuration.

The inclined lateral wall makes it possible to optimize the closing of the central opening.

In certain embodiments, the central opening shows a rounded edge.

That makes it possible to optimize the cooperation of the closing device of the membrane with the central opening.

In certain embodiments, the membrane comprises a fastening protrusion at the level of a circumferential edge of the membrane to fix the membrane in the receiving cavity.

In certain embodiments, the receiving cavity comprises a receiving groove of the fastening protrusion.

In certain embodiments, the membrane comprises at least one intermediate protuberance protruding from the membrane and arranged between the fastening protrusion and the closing device.

This intermediate protuberance makes it possible to modify the vibratory behaviour of the membrane and hence the damping characteristics of the anti-vibration hydraulic mount.

In certain embodiments, the intermediate protuberance is wedge-shaped in a cross-sectional view of the membrane.

In certain embodiments, the membrane shows an axial symmetry in the cross-sectional view of the membrane.

The membrane can thus be arranged in the receiving cavity in one direction and/or the other. What is more, the intermediate protuberance protruding from the membrane towards the aperture plate as well as the closing device protruding from the membrane towards the aperture plate make it possible to limit the deflection of from the membrane towards the aperture plate.

In certain embodiments, the second channel comprises an adjustment passageway that is in fluid communication with the central passageway and that extends partially around the central passageway in a circumferential direction, the tuning passageway being open towards the compensating chamber.

In certain embodiments, the partition member comprises a circular adjusting plate provided with a control opening and configured to be placed in the in the tuning passageway in different orientations.

The adjusting plate makes it possible to modify the length of the tuning passageway and thus the damping characteristics of the anti-vibration hydraulic mount.

In certain embodiments, the control plate comprises a plurality of lugs protruding radially from the adjusting plate.

In certain embodiments, the lugs are evenly distributed round the circumference of the control plate.

In certain embodiments, the control plate is fastened to the partition member by a plurality of fastening elements.

In certain embodiments, the fastening elements extend through the openings of the control plate that are defined by the lugs.

In certain embodiments, the partition member comprises a lower wall limiting the receiving cavity around the central opening.

In certain embodiments, the lower wall comprises a plurality of recesses.

These recesses make it possible to modify the damping characteristics of the anti-vibration hydraulic mount.

In certain embodiments, the recesses extend from the central passageway as far as the circular edge of the lower wall.

In certain embodiments, the recesses have the same shape and/or are distributed evenly in the lower wall in a circumferential direction.

In certain embodiments, the recesses have a triangular shape when seen from above.

The present disclosure likewise concerns an anti-vibration hydraulic mount comprising:
  a partition member such as defined previously,
  an elastomeric body defining, with the partition member, a working chamber,
  a flexible compensating membrane defining, with the partition member, a compensating chamber,
  the separating element separating the working chamber from the compensating chamber.

BRIEF DESCRIPTION OF THE DRAWINGS

Other characteristics and advantages of the subject matter of the present disclosure can be seen from the following description of the embodiments, given as non-limiting examples, with reference to the attached figures.

FIG. 1 is a schematic side view of an anti-vibration device, according to one embodiment.

FIG. 2 is a schematic view of the top of the anti-vibration device in FIG. 1.

FIG. 3 as a cross-sectional view of FIG. 2 according to intersection line III-III.

FIG. 4A is an exploded view of the top view of the separating element of FIG. 3.

FIG. 4B is an exploded view as a view from below of the partition member of FIG. 3.

FIG. 5A is a schematic perspective view of the membrane of FIG. 4.

FIG. 5B is a schematic cross-sectional and perspective view of FIG. 4.

FIG. 6A is a cross-sectional view of the partition member of FIG. 3 in a closed configuration.

FIG. 6B is a partial enlargement of FIG. 6A.

FIG. 7A is a cross-sectional view of the partition member of FIG. 3 in an open configuration.

FIG. 7B is a partial enlargement of FIG. 7A.

Of all the figures, the elements in common are identified by identical numerical references.

DETAILED DESCRIPTION

FIG. 1 shows a schematic view of an anti-vibration device 10. The anti-vibration device 10 comprises a support 12 comprising a receiving housing for an anti-vibration hydraulic mount 14. The anti-vibration hydraulic mount 14 is likewise named hydraulic module, hydromodule or hydromount. The support 12 is meant to be fastened to a vehicle chassis. The anti-vibration hydraulic mount 14 comprises a securing means 16 in which the vehicle's engine can be secured. In the embodiment of FIG. 1, the securing means 16 is a cavity.

The anti-vibration hydraulic mount 14 shows a configuration known in its own right.

As shown in FIG. 3, the securing means 16 are borne by an elastic body 18, for example made of elastomeric material, delimiting at least partially a working chamber 20. A partition member 22 is fastened to the elastic body 18. A compensating membrane 24 is fastened to the partition member 22. The compensating membrane 24 is flexible but not extensible and delimits at least partially a compensating chamber 25.

The working chamber 20 is delimited by the elastic body 18 and the partition member 22. The compensating chamber 25 is delimited by the partition member 22 and the compensating membrane 24.

The working chamber 20 and the compensating chamber 25 are interconnected by a first channel 26 and a second channel 28. Hence, when loads act on the elastic body 18, the volume of the working chamber 20 is reduced as a result of compression of the elastic body 18, in such a way that a hydraulic fluid present in the working chamber 20 flows through the first channel 26 and/or through the second channel 28 towards the compensating chamber 25 and inversely.

The configuration of the partition member 22 can be seen better in FIGS. 4, 5 and 6.

As shown in FIGS. 4A and 4B, the partition member 22 comprises an aperture plate 30, a membrane 32, a main body 34, and a tuning plate 36. The partition member 22 shows a general cylindrical shape. The main body 34 defines the first channel 26, the second channel 28 and a receiving cavity 38 for the membrane 32. The receiving cavity 38 is a cylindrical space having a circular shape when viewed from above. The first channel 26 extends circumferentially around the receiving cavity 38. The first channel 26 is open permanently, so that the fluid can always flow from the working chamber 20 to the compensating chamber 25 and vice versa. The length of the first channel 26 is chosen in such a way that the resonance frequency of the fluid in the first channel 26 is adjusted to the vibration frequency to be dampened by means of the first channel 26.

The aperture plate 30 comprises a plurality of openings 31 that link the working chamber 20 to the receiving cavity 38 and to the first channel 26. The aperture plate 30 is fastened to the main body 34 by means of fastening elements such as screws and/or bolts.

The second channel 28 comprises a central passageway 40 having a central opening 42 and a tuning passageway 44. The central passageway 40 is open towards the receiving cavity 38 by means of the central opening 42. The central passageway 40 is arranged at the centre of the main body 34 and extends in an axial direction X. The tuning passageway 44 is in fluid communication with the central passageway 40 and extends around the central passageway 40 in a circular or spiral manner. The tuning passageway 44 is open towards the compensating chamber 25. The tuning passageway 44 is at least partially closed by the adjusting plate 36.

The adjusting plate 36 comprises a tuning opening 46 that is arranged in such a way that it is located above the tuning passageway 44 irrespective of the orientation of the tuning plate 36. The dimensions of the tuning opening 46 are designed in its width, measured in a radial direction R, and its length, measured in a circumferential direction C, in such a way that it corresponds to the width of the adjustment passageway 44, while the length of the tuning opening 46 is much shorter than the length of the tuning passageway 44, in particular, the width and the length of the tuning opening 46 are approximately of the same order.

The adjusting plate 36 comprises a plurality of lugs 48, in the embodiment in the FIGS. 4, 5 and 6, six lugs 48 which extend radially, i.e. in the radial direction R, starting from the adjusting plate 36. The lugs 49 are distributed 35 uniformly around the circumference of the circular adjusting plate 36. The lugs 48 define the recesses among one another. The tuning plate 36 is fastened to the main body 34 with the help of securing means (not shown) such as screws and bolts. The securing means extend through the locations, for example fastening holes for screws 50 and are fixed in these locations. As a result of the uniform distribution of the lugs 48 and of the locations, the tuning plate 36 can be arranged on the main body 34 according to a plurality of orientations.

The receiving cavity 38 is delimited by a lower wall 52 and a circular wall 54 of the main body 34. The circular wall 54 separates the receiving cavity 38 from the first channel 26. The lower wall 52 comprises the central opening 42 at its centre. The lower wall 52 has recesses 26, and in the embodiment shown three recesses 56. The recesses 56 extend from the central opening 42 as far as the circular wall 54. The recesses 56 have a triangular shape. The recesses 56 are preferably distributed uniformly round the circumference of the lower wall 52.

The membrane 32 comprises a fastening projection 60, an intermediate protuberance 62 and a closing device 64, that can be formed in one piece, for example, manufactured by a moulding process. The fastening projection 60 is an annular rib protruding from both sides of the membrane 32. The height H of the fastening projection 60 in the axial direction X is larger than the height of the receiving cavity 38. During the fastening of the aperture plate 30 to the main body 34, the fastening projection 60 is compressed, mainly in the axial direction X, between the aperture plate 30 and the main body 34, in such a way that the membrane 32 is fastened to the separating element 22. As shown in FIG. 6A, the receiving cavity 38 has a receiving groove 58 of the fastening projection 60 of the membrane 32.

As shown in FIG. 5B, the intermediate protuberance 62 is arranged between the annular fastening projection 60 and the annular closing device 64. The protuberance 62 is wedge-shaped in a cross-sectional view and protrudes from both sides of the membrane 32. The intermediate protuberance 62 shows an annular shape viewed from the top of the membrane 32.

In the embodiment in FIG. 6B, the closing device 64 comprises an annular protrusion 66 having a lateral wall 68. The annular protrusion 66 is wedge-shaped in a cross-sectional view and protrudes from both sides of the membrane 32. The lateral wall 68 is inclined in relation to the axial direction X, i.e. the extending direction of the central passageway 40. The central opening 42 shows a rounded edge 42A.

As shown in FIGS. 6A and 6B, in the closed configuration of the membrane 32, the lateral wall 68 of the annular protuberance 66 abuts against the rounded edge 42A of the central opening 42. Hence, when the membrane 32 is deflected by a certain distance or a first distance, the annular protuberance 66 of the closing device 64 abuts against the central opening 42 in such a way that the central passageway 40 is closed, blocking the flow of liquid in the second channel 28.

As shown in FIGS. 7A and 7B, in the open configuration of the membrane 32, i.e. when there is no pressure difference between the working chamber 20 and the compensating chamber 25, the annular protuberance 66 and the central opening 42 are spaced apart from each other. Hence, hydraulic fluid can flow from the central passageway 40 into the recesses 56 and vice versa.

As shown in FIG. 5B, the membrane 32 is symmetrical relative to a Y axis in a cross-sectional view. The parts of the intermediate protuberance 62 and of the annular protuberance 66 protruding towards the aperture plate 30 act as a stop to prevent an excessively large deflection of the membrane 32 towards the aperture plate 30.

In FIG. 5B, the dimensions of the membrane 32 have been shown. Diameter D1 of an outer end of the annular protuberance 66, corresponding to the largest diameter of the annular protuberance 66, is between 15 and 20 mm (fifteen and twenty millimeters), preferably between 16 and 19 mm (sixteen and nineteen millimetres). In the embodiment shown, the diameter D1 is about 17.5 mm (seventeen and a half millimeters). The diameter D2 of an inner end of the annular protuberance 66 corresponding to the smallest diameter of the annular protuberance 66, is between 7 and 12 mm (seven and twelve millimetres), and preferably between 8 and 11 mm (eight and eleven millimetres). In the embodiment shown, the diameter D2 is about 9.5 m (nine and a half millimetres). The diameter D3 of the most protruding part of the annular protuberance 66 is between 12 and 17 mm (twelve and seventeen millimetres) and preferably between 13 and 16 mm (thirteen and sixteen millimetres). In the embodiment shown, the diameter D3 is about 14.5 mm (fourteen and a half millimetres). The thickness E of a portion of the membrane 32 arranged inside the annular protuberance 66 is between 0.5 and 2 mm (half a millimeter and two millimetres). In the embodiment shown, the thickness E is about 1.5 mm (one and a half millimetres).

The technical principle is as follows: in the presence of vibrations having a high frequency, i.e. between 20 Hz and 25 Hz (hertz), but a low amplitude, i.e. of the order of 0.1 mm, the membrane 32 vibrates at an amplitude of 0.1 mm due to the difference in pressure between the working chamber 20 and the compensating chamber 25. As a result of the low amplitude of the vibrations, the closing device 64 does not block the central passageway 40 so that the first channel 26 as well as the second channel 28 contribute to the damping characteristics of the anti-vibration hydraulic mount 14.

When the membrane 32 is subjected to vibrations having a low frequency, i.e. an idling frequency of the engine of approximately 10 Hz, and of high amplitudes, i.e. of the order of 1 mm, the membrane 32 is deflected in such a way that the closing device 64 abuts against the central opening 42. Hence, the central passageway 40 is blocked. In this case, only the first channel 26 contributes to the damping characteristics of the anti-vibration hydraulic mount 14. That means that in the presence of vibrations having a high amplitude and a low frequency, only the first channel 26 contributes to the damping characteristics of the anti-vibration hydraulic mount 14, whilst in the presence of vibrations having a high frequency and a low amplitude, the first channel 26 and the second channel 28 contribute to the damping characteristics of the anti-vibration hydraulic mount. Consequently, the damping characteristics of the anti-vibration hydraulic mount 14 differ in the two frequency ranges in such a way that the membrane 32 acts like a passive switch for changing the main frequency of the damping characteristics. As the membrane 32 does not need to be switched actively between a closed position and an open position, the membrane 32 is a passive switch making it possible to change the damping characteristics of the anti-vibration hydraulic mount 14.

It has been ascertained that the recesses 56 and the intermediate protuberance 62 are elements making it possible to modify the damping characteristics of the anti-vibration hydraulic mount 14. However, the way in which the intermediate protuberance 62 and the recesses 56 contribute to this effect is not unequivocal. Hence, the central protuberance 62 and some recesses 56 could be different.

As the adjusting plate 36 can be fastened to the main body 34 in different positions and as consequently the tuning opening 46 can be arranged in different positions in the tuning passageway 44, the length of the second channel 28 can be modified. Hence, by changing the orientation of the adjusting plate 36, the damping characteristics of the second channel 28 can easily be adjusted to the engine configured to be connected to the anti-vibration hydraulic mount 14. For example, as a function of the position of the tuning opening 46, the anti-vibration hydraulic mount 14 can be used for the damping of a three-cylinder engine as well as for the damping of a four-cylinder engine. As a consequence, the anti-vibration hydraulic mount 14 and, in particular, the partition member 22, can be used for different engines. Only the orientation of the adjusting plate 36 will have to be adapted to the different engines.

Even though the present disclosure has been described by referring to an example of specific realization, it is apparent that different modifications and changes can be made to these examples without departing from the general scope of the invention as defined by the claims. What is more, individual characteristics of the different embodiments mentioned can be combined in additional embodiments. Consequently, the description and the drawings can be considered in an illustrative rather than a restrictive sense.

The invention claimed is:

1. A partition member configured to be arranged between a working chamber and a compensating chamber of an anti-vibration hydraulic mount, the partition member comprising:
    a first channel configured to form a permanently open passageway between the working chamber and the compensating chamber,
    a second channel configured to form a passageway between the working chamber and the compensating chamber, the second channel comprising a central passageway extending in an axial direction, the central passageway being provided with a central opening,
    a receiving cavity open towards the working chamber and in fluid communication with the central passageway through the central opening, and
    a membrane fixed in the receiving cavity and separating the receiving cavity into two sub-spaces separated fluidically from each other, the membrane comprising a closing device protruding from the membrane towards the central opening and configured for an open configuration and a closed configuration,
    wherein the closing device is spaced apart from the central opening in the open configuration when the membrane is deformed towards the central passageway over a first distance,
    wherein the closing device is positioned against the central opening to close the central passageway in the closed configuration when the membrane is deformed towards the central passageway beyond the first distance,
    wherein the second channel comprises a tuning passageway in fluid communication with the central passageway and extends partially around the central passageway in a circumferential direction, the tuning passageway being open towards the compensating chamber,
    wherein the partition member comprises a circular adjusting plate provided with a tuning opening and configured to be placed in the tuning passageway in different orientations, and
    wherein the adjusting plate comprises a plurality of lugs projecting radially from the adjusting plate, and the lugs are distributed regularly around the circumference of the adjusting plate.

2. The partition member according to claim 1, wherein the partition member comprises a lower wall limiting the receiving cavity round the central opening, with the lower wall comprising a plurality of recesses, and the recesses extending from the central passageway as far as a circular edge of the lower wall.

3. The partition member according to claim 2, wherein the recesses have the same shape or the recesses are distributed evenly in the lower wall in a circumferential direction.

4. The partition member according to claim 3, wherein recesses have a triangular shape when viewed from above.

5. The partition member according to claim 2, wherein recesses have the same shape and are distributed evenly in the lower wall in a circumferential direction.

6. The partition member according to claim 5, wherein recesses have a triangular shape when viewed from above.

7. The partition member according to claim 1, wherein the annular protuberance has a lateral wall,
    wherein the lateral wall is inclined in relation to the axial direction of the central passageway, the annular protuberance configured for positioning against an internal circumferential wall of the central opening in the closed configuration, and wherein the central opening includes a rounded edge.

8. The partition member according to claim 1, wherein, in the open configuration, a fluid can flow from the central passageway into recesses, and vice versa.

9. The partition member according to claim 1 wherein the membrane comprises a fastening projection at a level of a circumferential edge of the membrane to fasten the membrane in the receiving cavity, wherein the membrane comprises at least one intermediate protuberance projecting from the membrane and arranged between the fastening projection and the closing device, wherein the intermediate protuberance is wedge-shaped in a cross-sectional view of the membrane, and wherein the membrane has an axial symmetry in the cross-sectional view of the membrane.

10. The partition member according to claim 1, wherein the adjusting plate is fastened to the partition member by a plurality of securing elements, the securing elements extending through openings in the adjusting plate and defined by the lugs.

11. An anti-vibration hydraulic mount comprising:

a partition member according to claim 1, an elastomeric body, the elastomeric body and the partition member together defining the working chamber, and a flexible compensating membrane, the flexible compensating membrane and the partition member together defining the compensating chamber, wherein the partition member separates the working chamber from the compensating chamber.

12. The partition member according to claim 1, wherein the adjusting plate is fastened to the partition member by a plurality of securing elements, the securing elements extending through openings in the adjusting plate and defined by the lugs.

\* \* \* \* \*